E. S. SCRIPTURE.
Attaching Hubs to Axles.
No. 13,962. Patented Dec 18. 1855
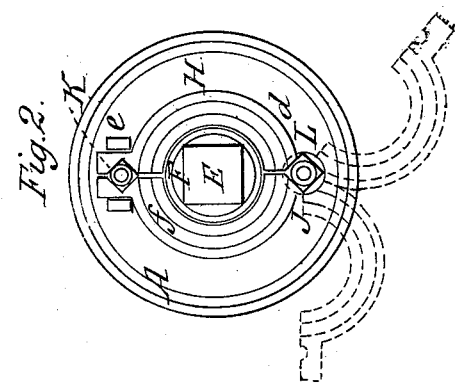
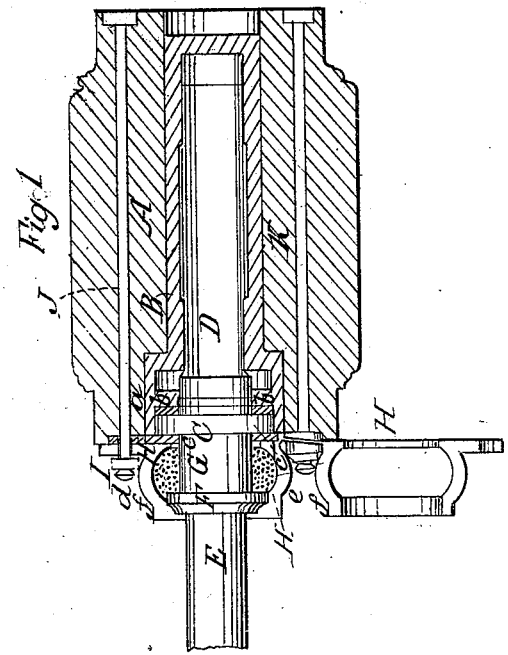

UNITED STATES PATENT OFFICE.

E. S. SCRIPTURE, OF GREEN POINT, NEW YORK.

ATTACHING HUBS TO AXLES.

Specification of Letters Patent No. 13,962, dated December 18, 1855.

*To all whom it may concern:*

Be it known that I, E. S. SCRIPTURE, of Green Point, in the county of Kings and State of New York, have invented a new and Improved Mode of Attaching Hubs to Axles; and I do hereby declare that the following is a full, clear, and exact description of the same, reference being had to the annexed drawings, making a part of this specification, in which—

Figure 1, is a longitudinal section of a hub secured to an axle according to my improved plan. Fig. 2, is a back end view of ditto.

Similar letters of reference indicate corresponding parts in the several figures.

My invention consists in attaching to the back end of the hub a jointed annular plate provided with a flange or socket, the socket encompassing a lubricating gasket and shield collar, and the annular plate fitting behind the usual wearing collar attached to the back part of the arm of the axle.

To enable those skilled in the art to fully understand and construct my invention, I will proceed to describe it.

A, represents a hub of usual construction, and B, represents the metal box or pipe secured in the center of the hub, which box or pipe is also constructed in the usual way.

C, represents a collar which is attached to the back part of the arm, D, of the axle E. This collar as usual fits within a recess (*a*), in the back part of the box or pipe, B, and bears against a leather washer (*b*). The back surface of the collar has a leather washer (*c*), placed against it, see Fig. 1.

F, represents a shield collar which is attached to the arm D, a short distance from the collar C. The space between the two collars C, F, is filled with a lubricating gasket, G.

H, represents an annular plate which is formed of two parts connected by a joint, I. The plate H, is attached to the back end of the hub, A, by a bolt, J, which passes longitudinally through the hub, A, the inner end of the bolt serving as a pintle for the joint, I. A nut (*d*), is fitted on the inner end of the bolt, J. The ends of the plate, H, are secured together on the back end of the hub by means of a nut (*e*), which is fitted on the end of a bolt, K, which also passes longitudinally through the hub, A, the nut (*e*), by being screwed down forcing the ends of the plate in any proper catch or fastening. Each part of the plate H, has a semi-circular projecting flange (*f*), attached to it. These flanges when the ends of the plate H, are brought together form a collar which encompasses the gasket, G, and shield collar, F, while the plate H, is fitted behind the collar C, on the arm, D, and thereby secures the hub to the axle.

The advantages of the above improvement, are: The wearing collar, C, will be kept perfectly lubricated at all times by the gasket, G, and the gasket may be supplied with oil by simply opening the plate H, and the hub may be detached from the axle by merely opening the plate, the bolts, J, K, not requiring to be drawn from the hub as is usual with the ordinary plate and collar attachment. And in case a new plate H, is required it may be attached to the back end of the hub without dividing the axle which is now required to be done in the ordinary hub attachment above alluded to in order that new plates may be attached to the hub.

Having thus described my invention, what I claim as new and desire to secure by Letters Patent is,

The plate H, jointed or formed of two parts and provided with flanges (*f*), as shown in combination with the shield collar, F, and gasket, G, arranged substantially as shown for the purpose specified.

ELIPHALET S. SCRIPTURE.

Witnesses:
 Jos. GEO. MASON,
 WM. TUSCH.